United States Patent [19]

Henderson

[11] Patent Number: 4,906,222

[45] Date of Patent: Mar. 6, 1990

[54] BELT TENSIONER AND METHOD OF MAKING THE SAME

[75] Inventor: Dewey D. Henderson, Springfield, Mo.

[73] Assignee: Dayco Products, Inc., Dayton, Ohio

[21] Appl. No.: 376,795

[22] Filed: Jul. 7, 1989

[51] Int. Cl.⁴ .............................................. F16H 7/08
[52] U.S. Cl. ................................................... 474/135
[58] Field of Search ....................... 474/101, 109–111, 474/113–117, 133, 135

[56] References Cited

U.S. PATENT DOCUMENTS

| | | | |
|---|---|---|---|
| 4,596,538 | 6/1986 | Henderson | 474/135 |
| 4,601,683 | 7/1986 | Foster | 474/135 |
| 4,624,652 | 11/1986 | Foster | 474/135 |
| 4,784,631 | 11/1988 | Henderson | 474/135 |
| 4,832,666 | 5/1989 | Henderson | 474/135 |

*Primary Examiner*—Thuy M. Bui
*Attorney, Agent, or Firm*—Joseph V. Tassone

[57] ABSTRACT

A belt tensioner and method of making the same are provided, the tensioner comprising a support for being fixed relative to a belt, a belt engaging unit carried by the support and being movable relative thereto, a spring operatively associated with the support and the belt engaging unit for urging the belt engaging unit relative to the support and against the belt with the force to tension the belt, the support comprising a housing containing the spring and an arm plate that is interconnected to the housing by a shaft of the support, the belt engaging unit comprising an arm rotatably mounted on the shaft and having a portion disposed intermediate the arm plate and the housing so as to be rotatable thereto, and a bushing disposed between the portion of the arm and the arm plate to facilitate movement therebetween, the arm plate having an extension extending around the portion of the arm and being operatively interconnected to the housing to tend to prevent cocking of the arm on the shaft when the belt engaging unit is tensioning the belt.

20 Claims, 5 Drawing Sheets

BELT TENSIONER AND METHOD OF MAKING THE SAME

BACKGROUND OF THE INVENTION

1. Field of the Invention

This invention relates to a new tensioner for a power transmission belt or the like and to a new method of making the same.

2. Prior Art Statement

It is known to provide a tensioner for a power transmission belt that is adapted to be operated in an endless path, the tensioner comprising a support means for being fixed relative to the belt, a belt engaging means carried by the support means and being movable relative thereto, spring means operatively associated with the support means and the belt engaging means for urging the belt engaging means relative to the support means and against the belt with a force to tension the belt, the support means comprising a housing means containing the spring means therein, the support means comprising an arm plate means, the support means comprising a shaft means interconnecting the arm plate means to the housing means, the belt engaging means comprising an arm rotatably mounted on the shaft means and having a portion disposed intermediate the arm plate means and the housing means so as to be rotatable relative thereto, and a bushing means disposed between the portion of the arm and the arm plate means to facilitate movement therebetween. For example, see the Thomey et al. U.S. Pat. No. 4,473,362.

Also see the Kraft U.S. Pat. No. 4,285,676; the Thomey U.S. Pat. No. 4,551,120 and the Henderson U.S. Pat. No. 4,661,087 for similar belt tensioners.

SUMMARY OF THE INVENTION

It is one feature of this invention to provide a new belt tensioner wherein the tensioner has means to tend to prevent the belt engaging arm from tending to cock on its shaft means due to the force of the belt being tensioned thereby acting on the pulley means of the belt engaging arm in an offset relation to the shaft means for the belt engaging arm.

In particular, it was found, according to the teachings of this invention, that when the pulley means of the belt engaging arm of a belt tensioner has the belt engaging surface thereof disposed outside the axial length of the shaft means that carries the belt engaging arm, there is a tendency of the belt engaging arm to cock on the shaft means and thereby tend to rapidly wear out the bushing means of the shaft means that is disposed between the shaft means and the arm to facilitate rotatable movement therebetween.

However, it was found according to the teachings of this invention that the arm plate means of such a tensioner can have an extension that is disposed around the arm and is fastened to the housing means of the tensioner in such a manner that the arm plate means tends to prevent adverse cocking of the belt engaging arm on its shaft means.

It was also found, according to the teachings of this invention that such an extension on the arm plate means can be utilized in a unique manner to frictionally dampen the rotary movement of the belt engaging arm relative to the support means of the tensioner as will be apparent hereinafter.

Thus, one embodiment of this invention comprises a belt tensioner for a power transmission belt that is adapted to be operated in an endless path, the tensioner comprising a support means for being fixed relative to the belt, a belt engaging means carried by the support means and being movable relative thereto, spring means operatively associated with the support means and the belt engaging means for urging the belt engaging means relative to the support means and against the belt with a force to tension the belt, the support means comprising a housing means containing the spring means therein, the support means comprising an arm plate means, the support means comprising a shaft means interconnecting the arm plate means to the housing means, the belt engaging comprising an arm rotatably mounted on the shaft means and having a portion disposed intermediate the arm plate means and the housing means so as to be rotatable relative thereto, and a bushing means disposed between the portion of the arm and the arm plate means to facilitate movement therebetween, the arm plate means having an extension extending around the portion of the arm and being operatively interconnected to the housing means to tend to prevent cocking of the arm on the shaft means when the belt engaging means is tensioning the belt.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Another object of this invention is to provide a new combination of such a tensioner and a belt being tensioned thereby, the combination of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired.

Therefore, this invention is not to be limited to only the embodiments illustrated in the drawings because the drawings are merely utilized to illustrate one of the wide variety of uses of this invention.

Figures 1, 2, 3:
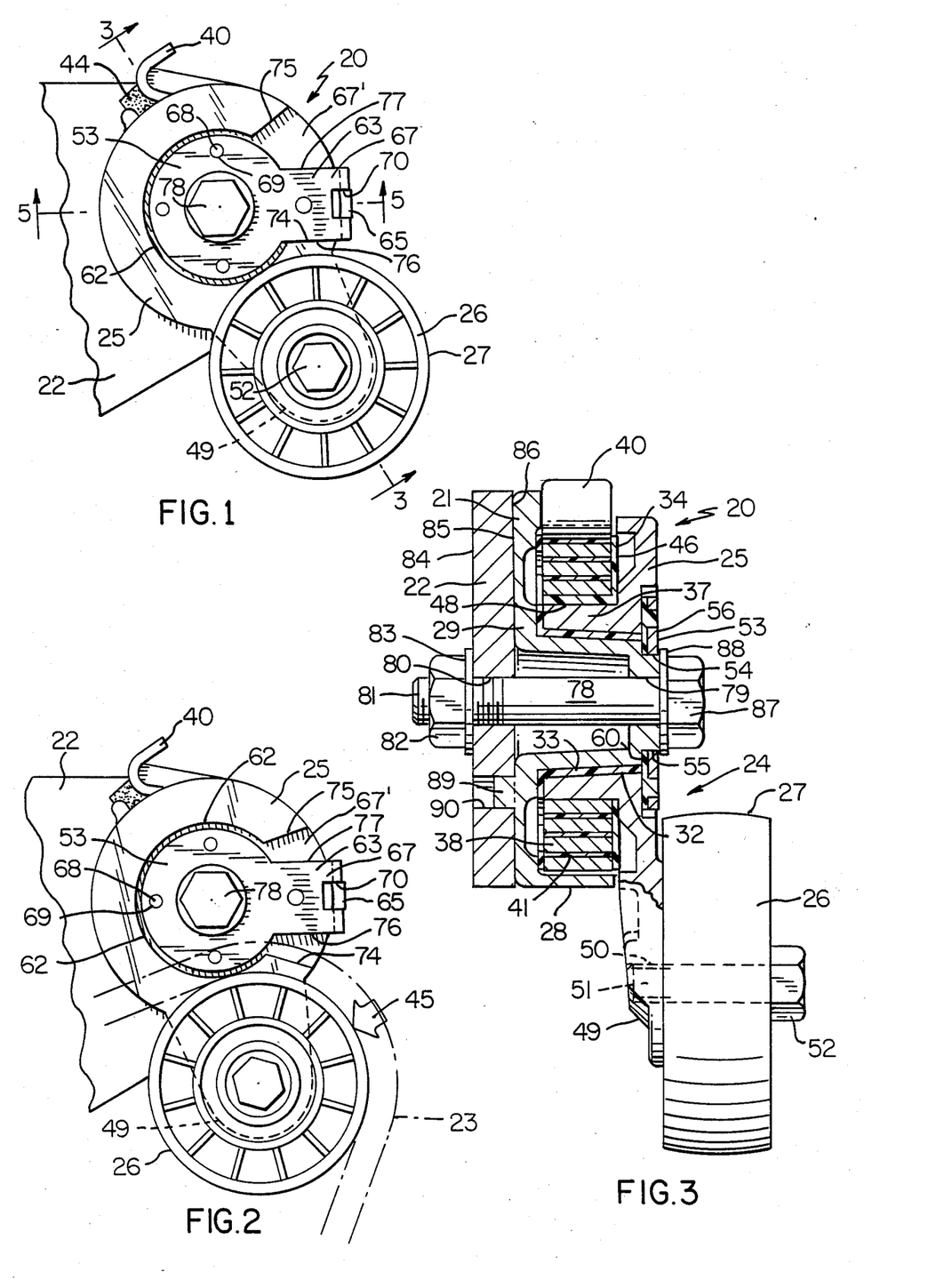
FIG. 1 is a fragmentary front view of the new belt tensioner of this invention mounted to a suitable support structure and being in one position thereof.
FIG. 2 is a view similar to FIG. 1 and illustrates the tensioner tensioning a power transmission belt that is illustrated in dashed lines.
FIG. 3 is an enlarged cross-sectional view taken on line 3—3 of FIG. 1.

Referring now to FIGS. 1, 2 and 3, the new tensioner of this invention is generally indicated by the reference numeral 20 and comprises a support means 21 that is fixed to a supporting structure 22, such as a support bracket for an internal combustion engine (not shown) of a transportation vehicle (not shown) or the like so that the support means 21 is fixed from movement relative to a power transmission belt 23 that is adapted to be operated in an endless path and that is illustrated by dashed lines in FIG. 2, the belt tensioner 20 also comprising a belt engaging means that is generally indicated by the reference numeral 24 and comprising a belt engaging arm 25 that is rotatably mounted on the support means 21 in a manner hereinafter set forth and carrying a rotatable pulley 26 having an external peripheral surface 27 adapted to engage the belt 23 to tension the same in a manner and for reasons well known in the art. For example, see the aforementioned four U.S. patents, namely, the Kraft, U.S. Pat. No. 4,285,676; the patent to Thomey et al, U.S. Pat. No. 4,473,362; the patent to Thomey, U.S. Pat. No. 4,551,120, and the patent to Henderson, U.S. Pat. No. 4,661,087, whereby these four patents are being incorporated into this disclosure by this reference thereto.

The support means 21 of the tensioner 20 comprises a generally cup-shaped housing 28 having a closed end 29 and an open end 30 whereby a chamber 31 is defined in the housing 28.

The support means 21 of the tensioner 20 also comprises a shaft means 32 which in the embodiment of the tensioner 20 of this invention is formed integral and one-piece with the housing means 28 so as to extend from the end wall 29 thereof and out through the open end 30 thereof.

Since the housing means 28 and arm 25 are formed from metallic material, such as by casting, an annular bushing 33 of any suitable antifriction material, such as a suitable polymeric material, is telescoped onto the shaft means 32 and can have an annular disc-like flange 34 at one end thereof that is disposed adjacent the closed end wall 29 of the housing means 28.

The belt engaging arm 25 has a portion 35 that is provided with an opening 36 passing therethrough and defining a hub portion 37 that is telescopically disposed on the shaft means 32 of the support means 21 with the annular bushing 33 being disposed therebetween whereby the belt engaging arm 25 is adapted to rotate relative to the support means 21 with the hub portion 37 being disposed in the chamber 31 of the housing means 28 while the portion 35 of the arm 25 is disposed external to the housing means 28 and substantially closes the open end 30 thereof.

Figure 4:
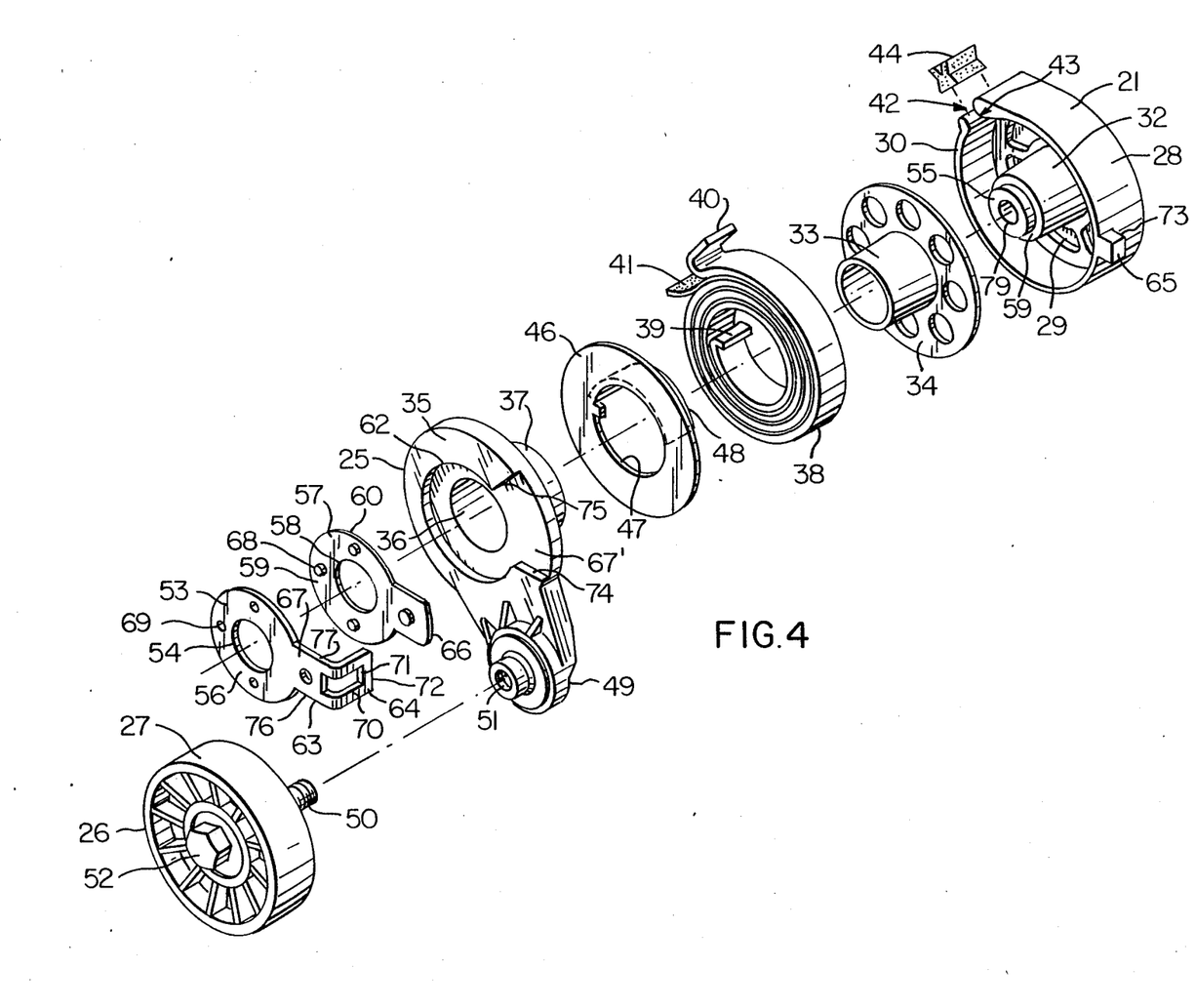
FIG. 4 is an exploded perspective view of the various parts of the belt tensioner of FIGS. 1-3.
Figure 5:
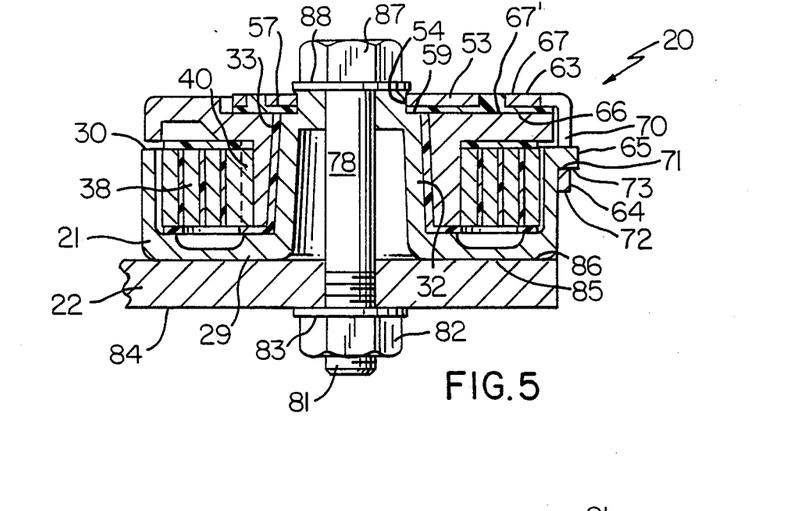
FIG. 5 is an enlarged fragmentary cross-sectional view taken on line 5—5 of FIG. 1.

A metallic torsion spring 38 is coiled in a spiral relation to define an inner end 39 thereof and an outer end 40 thereof and can have a strip of antifriction material 41 interleaved between the coils thereof in a manner well known in the art, the torsion spring 38 being disposed in the chamber 31 of the housing means 28 and having its inner end 39 operatively interconnected to the belt engaging arm 25 by being received in a suitable slot (not shown) formed in the hub portion 37 thereof while the other end 40 of the torsion spring 38 extends out of a slot means 42 of the housing means 28 and hooks over an edge means 43 thereof so as to operatively interconnect the spring 38 to the support means 21. A suitable flexible closure member 44 can thereafter be disposed in the slot 42 to close the same.

In this manner, the torsion spring 38 can initially be so wound that the same always tends to rotate the belt engaging arm 25 in a counterclockwise direction when viewing the tensioner 20 in FIGS. 1 and 2 whereby it can be seen that the belt 23 being tensioned by such counterclockwise movement of the belt engaging arm 25 imposes a load on the pulley 26 that is represented by the arrow 45 in FIG. 2.

A flat disc-like member 46 formed of any suitable antifriction material, such as a suitable polymeric material, has a central opening 47 passing therethrough so as to be telescoped onto the hub portion 37 of the belt engaging arm 25 and thereby be disposed between the portion 35 of the belt engaging arm 25 and the torsion spring 38 so as to facilitate movement therebetween, the bushing 46 having a hub portion 48 that is disposed under the first coil of the torsion spring 38 adjacent the end 39 thereof to prevent cracking of the torsion spring 38 all for the reasons that are fully set forth in the aforementioned U.S. patent to Henderson, U.S. Pat. No. 4,661,087 and need not be further described.

The pulley 26 is rotatably mounted to an end 49 of the belt engaging arm 25 by having a threaded shaft means 50 thereof passing through an opening 51 in the end 49 of the arm 23 and being secured thereto by a nut means 52 so that the pulley 26 can rotate on its shaft means 50 relative to the belt engaging arm 25 in a manner conventional in the art.

The support means 21 of the tensioner 20 also comprises an arm plate means 53 that has a central opening 54 passing therethrough so as to receive a reduced cylindrical portion 55 of the shaft means 32 therein and be fixed thereto in any suitable manner, such as by having the cylindrical portion 55 staked over against the outer surface 56 of the arm plate means 54, whereby the arm plate means 53 is fixed from movement so that the belt engaging arm 25 is adapted to move relative thereto within certain limits as will be apparent hereinafter.

In order to facilitate movement of the belt engaging arm 25 relative to the arm plate means 53, a disc 57 of any suitable antifriction material, such as a suitable polymeric material, that has an opening 58 passing centrally therethrough is telescoped onto the projection 55 of the shaft means 32 so as to be disposed between the belt engaging means 25 and the arm plate means 53, the antifriction disc 57 being stacked against an annular surface 59 on the shaft means 32 when the portion 55 of the shaft means 32 is staked to the surface 56 of the arm plate means 53.

In this manner, one side 60 of the antifriction disc 57 is disposed against a side 61 of the portion 35 of the arm 25, the side 61 of the arm 25 having a central recess 62 formed therein to accommodate the shape of the antifriction disc 57 as well as the arm plate means 53 as will be apparent hereinafter.

As previously stated, it was found that the force load 45 of the belt 23 on the pulley 26 tends to cause the belt engaging arm 25 to cock on the shaft means 32 of the support means 21 and, thus, adversely wear out the bearing means 33 and such cocking of the arm 25 is particularly noticeable when the belt engaging surface 27 of the pulley 26 is offset out of the axial length of the shaft means 32 as is relatively apparent when viewing the tensioner 20 in the position of FIG. 3 thereof.

However, it was found according to the teachings of this invention that such adverse cocking of the arm 25 can be prevented if the arm plate means 53 is provided with an extension 63 that has a part 64 that is disposed around the portion 35 of the arm 25 and is interconnected to the housing means 28, such as to a projection means 65 thereof, the extension 63 being on the same side of the tensioner 20 that the belt 23 engages the pulley 26 so as to counter the belt force and hold the arm 25 from cocking on the shaft 32 even though the load force 45 is offset relative to the shaft 32.

It was also found according to the teachings of this invention that if the antifriction disc 57 is also provided with an extension 66 that is disposed under the first part 67 of the extension 63 of the arm plate means 53 so as to be engaged by an outer surface portion 67' of the arm 25 during rotary movement of the arm 25 relative to the support means 21, the force tending to cock the arm 25 toward the extension 63 of the arm plate mans 53 compresses the extension 66 of the antifriction material 57 between the part 67 of the arm plate means 53 and the surface 67' of the arm 25 in such a manner that the extension 66 of the material 57 acts as a friction dampening means tending to retard such rotary movement of the arm 25, such friction dampening means being particularly useful to prevent wearing out of the tensioner 20 for the reasons that are fully set forth in the aforementioned U.S. patent to Henderson, U.S. Pat. No. 4,611,087, and need not be further described.

In order to prevent rotational movement of the antifriction material 57 relative to the arm plate means 53, the material 57 can be interconnected to the arm plate means 53 in any suitable manner, such as by having a plurality of outwardly extending integral projections 68 thereof being received in suitable openings 69 in the arm plate means 53 as illustrated.

While the L-shaped extension 63 of the arm plate means 53 can be interconnected to the projection 65 of the housing means 28 in any suitable manner, the extension 63 illustrated in the drawings is provided with a slot means 70 therein that defines an edge 71 at the free end 72 of the extension 63 that is adapted to engage against a surface 73 of the projection 65 when the projection 65 is received in the slot 70 whereby the outward cocking force of the arm 25 against the extension 63 is retarded by the edge 71 of the extension 63 engaging the surface 73 of the projection 65 of the housing means 28.

Figure 7:
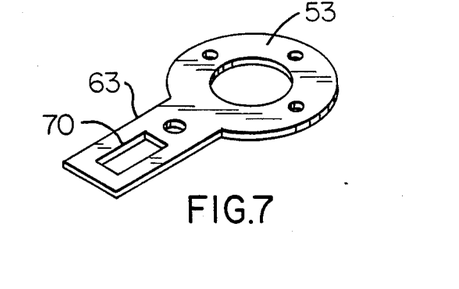
FIG. 7 is a perspective view of the arm plate means of the belt tensioner of this invention.
Figure 8:
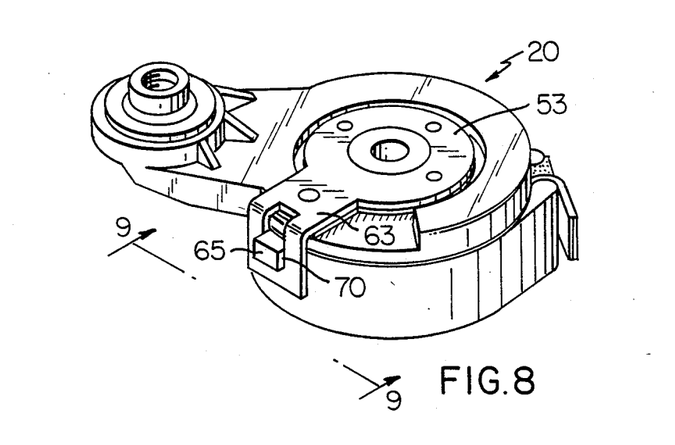
FIG. 8 is a perspective view illustrating the belt tensioner of this invention utilizing the arm plate means of FIG. 7 after the same has been bent in place.

During the assembling of the tensioner 20 of this invention by the method of this invention, the extension 63 can be preformed into the L-shape thereof so as to be hooked over the projection 65 before the arm plate means 53 is affixed to the shaft means 32. Alternately, the extension 63 could initially be in a straight position that is coplanar with the rest of the arm plate means 53 as illustrated in FIG. 7 and after the arm plate means 53 is secured to the shaft means 32, the extension 63 can be bent into the L-shape at the same time that the slot 70 is receiving the projection 65 therein as illustrated in FIG. 8.

In any event, it can be seen that the extension 63 is operatively interconnected to the housing means 28 on the same side of the tensioner 20 that the belt 23 is to engage the surface 27 of the pulley means 26 and would tend to cock the arm 25 on the shaft means 32 so that the surface 67' thereof would tend to move away from the housing means 28 on that side of the tensioner 20.

In order to limit rotary movement of the arm 25 relative to the support means 21, the recess 62 in the arm 25 is formed in such a manner that the recess 62 defines a pair of opposed stop edges 74 and 75 between which the part 67 of the extension 63 of the arm plate means 53 is disposed.

In this manner, opposed side edges 76 and 77 of the part 67 of the extension 63 are adapted to be respectively engaged by the stops 74 and 75 of the arm 25 so as to limit rotary movement of the arm 25 in opposite directions thereof relative to the stationary arm plate means 53.

For example, when viewing the tensioner 20 in FIG. 1, it can be seen that the force of the torsion spring 38 tends to rotate the arm 25 in a counterclockwise direction until the stop 74 is disposed against the edge 76 of the extension 63 so as to prevent further movement of the arm 25 in a counterclockwise direction beyond the position of FIG. 1. Conversely, when the arm 25 is rotated in clockwise direction from the position illustrated in FIG. 1, the stop 74 moves away from the edge 76 of the extension 73 and the stop 75 moves toward the edge 77 thereof as illustrated in FIG. 2 so that when the stop 75 engages the edge 77, the arm 25 cannot move further in a such clockwise direction.

While the tensioner 20 is adapted to be mounted to the support structure 22 in any suitable manner, the same is mounted thereto by a single bolt means 78 that passes through a central opening 79 formed through the center of the shaft means 32 and through a suitable opening 80 in the support structure 22 so that its threaded end 81 can have a nut 82 threaded thereon and compact a suitable washer 83 against a side 84 of the support means 22 while a side 85 of the support means 21 of the tensioner 22 is being compacted against a side 86 of the support means 22 as an enlarged head 87 of the bolt 78 compacts a washer 88 against the side 56 of the arm plate means 53 as illustrated in FIG. 3.

In order to prevent rotation of the tensioner 20 on the single bolt means 78, an integral projection 89 of the support means 21 is disposed in an opening 90 formed in the support 22 in offset relation to the longitudinal axis of the bolt means 78 in a conventional manner.

After the tensioner 20 has been mounted to the support structure 22 in the manner previously described, the belt 23 is looped around the pulley 26 and since the length of the belt 23 is such that the same requires the pulley 26 to be moved in a clockwise direction from the "home" position of FIG. 1, the arm 25 is rotated in a clockwise direction to permit the belt 23 to be looped around the same so that the extension 63 is disposed intermediate the stops 74 and 75 as illustrated in FIG. 2 whereby the force of the torsion spring that tends to move the arm 25 in a counterclockwise direction back to the "home" position of FIG. 1 provides a tensioning force on the belt 23 in a manner well known in the art.

Thus, it can be seen that the tensioner 20 operates in a normal manner for a tensioner such as in the manner set forth in the aforementioned patent to Henderson, U.S. Pat. No. 4,661,087, except that the extension 63 thereof tends to prevent the arm 25 from cocking o the shaft means 32 and the tendency of the arm 25 to cock on the shaft means 25 compacts the extension 66 of the antifriction material 57 between the extension 63 of the arm plate means 53 and the arm 25 in such a manner that the same provides a frictional dampening force that tends to retard any rotary movement of the belt engaging arm 25 on the shaft means 25 while the same is tensioning the belt 23.

Thus, it can be seen that the extension 63 of the arm plate means 53 of this invention provides multiple functions, namely, prevents cocking of the arm 25 on the shaft means 32 due to an offset belt load on the pulley 26 of the tensioner 20, provides a frictional dampening function to tend to retard rotary movement of the arm 25 on the shaft means 32 and provides means for limiting the rotary movement of the arm 25 on the shaft means 25 by cooperating with the stops 74 and 75 thereof.

Figure 6:
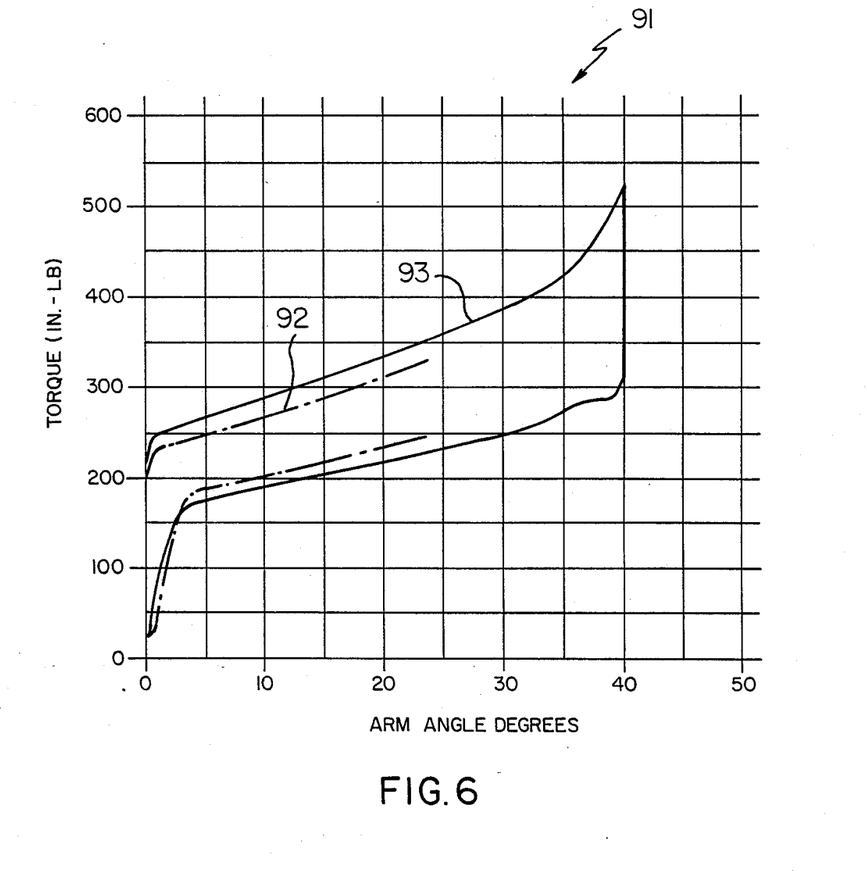
FIG. 6 is a graph illustrating the torque of the belt tensioner of this invention with and without the dampening means thereof.

The frictional dampening feature of the extension 66 of the antifriction material 57 is best illustrated by the graph 91 of FIG. 6 wherein the dash-dotted line 92 represents the tensioner 20 in its operation when the extension 66 of the antifriction material 57 has been removed from under the part 67 of the extension 63 of the arm plate means 53 whereas the full line representation 93 indicates the operation of the tensioner 20 when the extension material 66 of the antifriction disc 57 is being utilized in the manner previously set forth.

The amount of dampening force provided by the extension 66 of the antifriction material 57 can initially be set by having the extension 63 of the arm plate means 53 interconnected to the projection 65 of the housing means 28 in a manner to provide a spring load of the extension 63 on the arm 25, regardless of whether the arm 25 is cocking or not.

Figure 9:
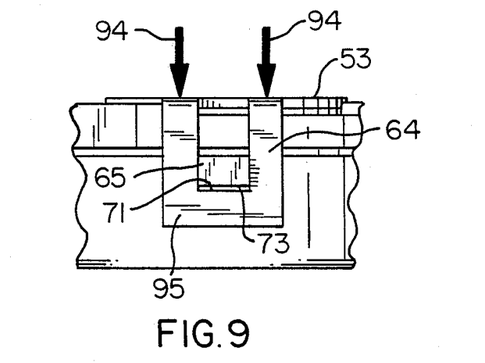
FIG. 9 is an enlarged fragmentary view of the tensioner of FIG. 8 and is taken in the direction of the arrows 9—9 thereof.
Figure 10:
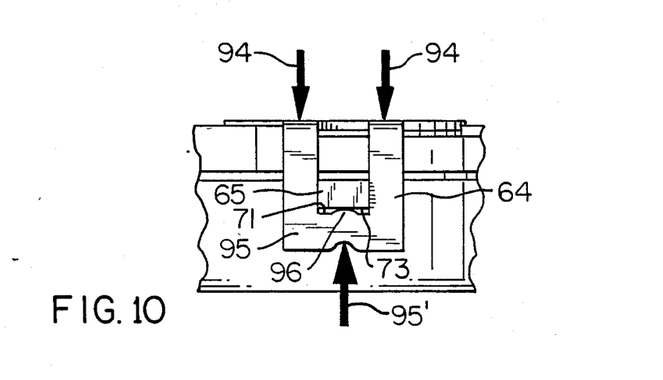
FIG. 10 is a view similar to FIG. 9 and illustrates how the arm plate means can be deformed to overcome tolerance problems and/or to set the effective force of the arm plate means.

For example, after the extension 63 is disposed over the projection 65 and the arm plate means 53 is disposed in the desired position thereof, such as by applying a force in the direction of the arrows 94 of FIGS. 9 and 10, the cross-portion 95 of the leg 64 of the extension 63 may have the surface 71 thereof spaced below the surface 73 of the projection 65 so that the cross-portion 95 can be upwardly deflected by a force 95', FIG. 10, to place a part 96 of the edge 71 firmly against the surface 73 of the projection 65 as illustrated in FIG. 10 so as to hold the extension 63 the desired distance from the surface 67' of the arm 25. This procedure can also be utilized to take up any tolerance differences between the projection 65 and the extension 63 of the arm plate means 53 during normal assembly operations.

Figure 11:
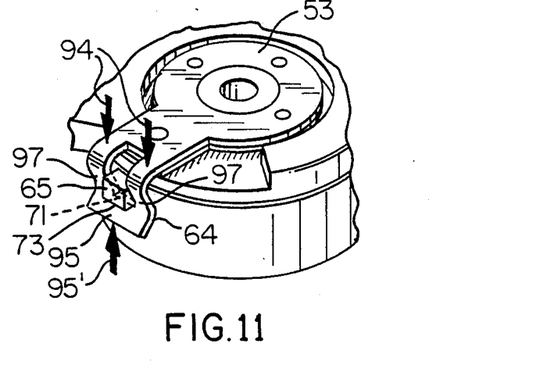
FIG. 11 is a view similar to FIG. 8 and illustrates another method of deforming the arm plate means for the tensioner of this invention.

Alternately, instead of deforming the cross-member 95 of the leg 64 of the extension 63 of the arm plate means 53, the side portions 97 of the leg 64 could be given an S-shape that can be further deformed by the forces 95' and 94 as illustrated in FIG. 11 so as to positively place the surface 71 of the leg 64 against the surface 73 of the projection 65 for setting the force of the arm plate means 53 and/or taking up tolerance differences as desired.

Alternately, the arm plate means 53 can have the extension 64 thereof interconnected to the housing means 28 in any other desired manner.

Figure 12:
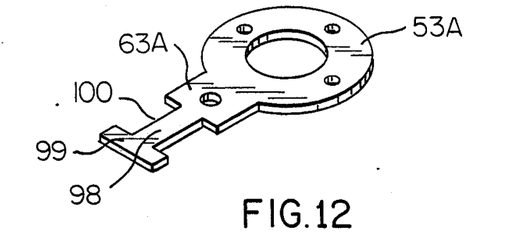
FIG. 12 is a perspective view of another embodiment of an arm plate means for another tensioner of this invention.
Figure 13:
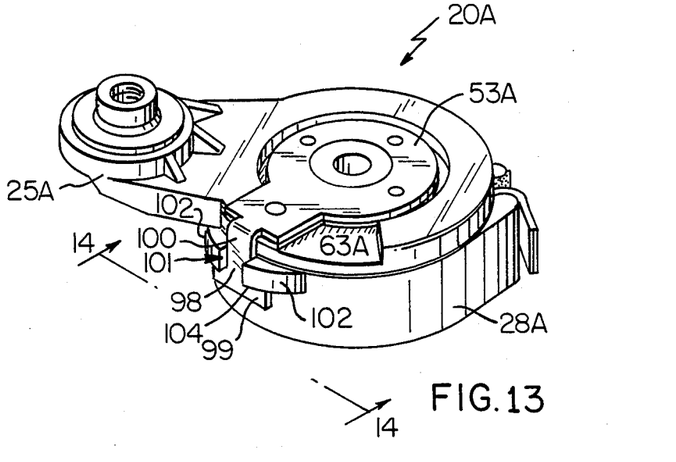
FIG. 13 is a perspective view illustrating the other tensioner of this invention utilizing the arm plate means of FIG. 12 after the arm plate means has been bent into its operating position.
Figure 14:
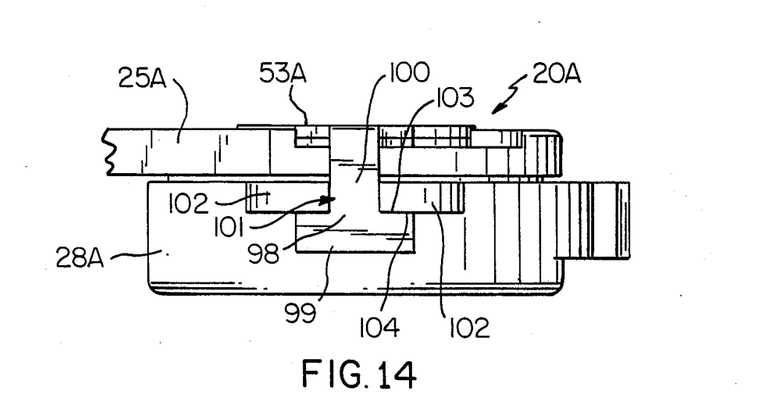
FIG. 14 is an enlarged fragmentary view of the tensioner of FIG. 13 and is taken in the direction of the arrows 14—14 thereof.

For example, reference is now made to FIGS. 12-14 wherein another tensioner of this invention is generally indicated by the reference numeral 20A and parts thereof similar to the tensioner 20 are indicated by like reference numerals followed by the reference letter "A".

It can be seen in FIG. 12 that the arm plate means 53A has the extension 63A thereof provided with a T-shaped free end 98 comprising a cross-member 99 and a leg 100 which is adapted to be received in a suitable slot 101 formed between two projection means 102 formed on the housing means 28A in spaced apart relation so that like edges 103 on the cross-member 99 will engage against like edges 104 on the projections 102 to prevent the arm plate means 53A from being cocked by the cocking force of the arm 25A for the reasons previously set forth.

In this manner, the housing 28A when being cast does not require a slide in the die thereof.

Therefore, it can be seen that this invention not only provides a new tensioner for a power transmission belt that is adapted to be operated in an endless path and a new combination therewith, but also this invention provides a new method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support means for being fixed relative to said belt, a belt engaging means carried by said support means and being movable relative thereto, spring means operatively associated with said support means and said belt engaging means for urging said belt engaging means relative to said support means and against said belt with a force to tension said belt, said support means comprising a housing means containing said spring means therein, said support means comprising an arm plate means, said support means comprising a shaft means interconnecting said arm plate means to said housing means, said belt engaging means comprising an arm rotatably mounted on said shaft means and having a portion disposed intermediate said arm plate means and said housing means so as to be rotatable relative thereto, and a bushing means disposed between said portion of said arm and said arm plate means to facilitate movement therebetween, the improvement wherein said arm plate means has an extension extending around said portion of said arm and being operatively interconnected to said housing means to tend to prevent cocking of said arm on said shaft means when said belt engaging means is tensioning said belt.

2. A tensioner as set forth in claim 1 wherein said bushing means has an extension that is disposed between said portion of said arm and said extension of said arm plate means, said extension of said bushing means tending to frictionally dampen the rotational movement of said arm relative to said arm plate means.

3. A tensioner as set forth in claim 2 wherein said bushing means is operatively interconnected to said arm plate means so as to be stationary relative to said portion of said arm.

4. A tensioner as set forth in claim 1 wherein said arm plate means and said extension thereof comprises a one-piece homogeneous member.

5. A tensioner as set forth in claim 1 wherein said belt engaging means comprises a pulley means rotatably carried by said arm and having a surface means for engaging said belt, said arm having a shaft on which said pulley means is rotatably mounted, said shaft being substantially parallel to said shaft means and offset, relative thereto so that surface means of said pulley means is outside the length of said shaft means.

6. A tensioner as set forth in claim 1 wherein said housing means has a projection means thereon, said extension of said arm plate means having a part that is operatively interconnected to said projection means to operatively interconnect said arm plate means to said housing means.

7. A tensioner as set forth in claim 6 wherein said projection means is disposed on the same side of said tensioner where said belt is to engage said belt engaging means.

8. A tensioner as set forth in claim 6 wherein said part of said extension of said arm plate means has an opening therein that receives said projection means therein.

9. A tensioner as set forth in claim 6 wherein said projection means has a slot means therein, said part of said extension of said arm means being T-shaped with the leg thereof being disposed in said slot means and the cross member thereof hooked against said projection means.

10. A tensioner as set forth in claim 6 wherein said extension is substantially L-shaped so as to have two legs disposed substantially at right angles relative to each other, one of said two legs comprising said part of said extension that is operatively interconnected to said projection means of said housing means.

11. A tensioner as set forth in claim 10 wherein said one leg has an opening passing therethrough and receiving said projection means therein.

12. A tensioner as set forth in claim 11 wherein said one leg is deformed after receiving said projection means in said opening thereof to tend to apply a certain frictional dampening force of said bushing means against said arm.

13. A tensioner as set forth in claim 1 wherein said portion of said arm has opposed stop means thereon, said extension of said arm plate means being disposed between said stop means and being respectively engaged thereby to limit the rotational movement of said arm in opposite directions thereof.

14. A tensioner as set forth in claim 13 wherein said arm has a surface interrupted by a recess means that has opposed edges that respectively define said stop means.

15. In the combination of a power transmission belt that is adapted to be operated in an endless path and a tensioner for said belt, said tensioner comprising a support means that is fixed relative to said belt, a belt engaging means carried by said support means and being movable relative thereto, spring means operatively associated with said support means and said belt engaging means, said spring means urging said belt engaging means relative to said support means and against said belt with a force that tensions said belt, said support means comprising a housing means containing said spring means therein, said support means comprising an arm plate means, said support means comprising a shaft means interconnecting said arm plate means to said housing means, said belt engaging means comprising an arm rotatably mounted on said shaft means and having a portion disposed intermediate said arm plate means and said housing means so as to be rotatable relative thereto, and a bushing means disposed between said portion of said arm and said arm plate means to facilitate movement therebetween, the improvement wherein said arm plate means has an extension extending around said portion of said arm and being operatively interconnected to said housing means to tend to prevent cocking of said arm on said shaft means caused by said belt engaging means tensioning said belt.

16. A combination as set forth in claim 15 wherein said bushing means has an extension that is disposed between said portion of said arm and said extension of said arm plate means, said extension of said bushing means tending to frictionally dampen the rotational movement of said arm relative to said arm plate means.

17. In a method of making a tensioner for a power transmission belt that is adapted to be operated in an endless path, said tensioner comprising a support means for being fixed relative to said belt, a belt engaging means carried by said support means and being movable relative thereto, spring means operatively associated with said support means and said belt engaging means for urging said belt engaging means relative to said support means and against said belt with a force to tension said belt, said support means comprising a housing means containing said spring means therein, said support means comprising an arm plate means, said support means comprising a shaft means interconnecting said arm plate means to said housing means, said belt engaging means comprising an arm rotatably mounted on said shaft means and having a portion disposed intermediate said arm plate means and said housing means so as to be rotatable relative thereto, and a bushing means disposed between said portion of said arm and said arm plate means to facilitate movement therebetween, the improvement comprising the steps of forming said arm plate means with an extension that extends around said portion of said arm, and operatively interconnecting said extension to said housing means to tend to prevent cocking of said arm on said shaft means when said belt engaging means is tensioning said belt.

18. A method of making a tensioner as set forth in claim 17 and including the steps of forming said bushing means to have an extension that is disposed between said portion of said arm and said extension of said arm plate means so that said extension of said bushing means tends to frictionally dampen the rotational movement of said arm relative to said arm plate means.

19. A method of making a tensioner as set forth in claim 17 and including the steps of forming said housing means to have a projection means thereon, and operatively interconnecting a part of said extension of said arm plate means to said projection means to operatively interconnect said arm plate means to said housing means.

20. A method of making a tensioner as set forth in claim 19 wherein said projection means is formed on the same side of said tensioner where said belt is to engage said belt engaging means.

* * * * *